US009028159B2

United States Patent
Pavithran et al.

(10) Patent No.: US 9,028,159 B2
(45) Date of Patent: May 12, 2015

(54) CAMERA MODULE WITH THREADLESS LENS BARREL ENGAGEMENT DESIGN

(75) Inventors: Prebesh Pavithran, Bukit Mertajam (MY); Yeow Thiam Ooi, Butterworth (MY); Haw Chyn Cheng, Butterworth (MY); Hung Khin Wong, Wing Onn Garden (MY); Giap Chye Toh, Butterworth (MY); Shun Kyo Low, Gelugor (MY)

(73) Assignee: Nan Chang O-Film Optoelectronics Technology Ltd, Nanchang (CN)

( * ) Notice: Subject to any disclaimer, the term of this patent is extended or adjusted under 35 U.S.C. 154(b) by 0 days.

(21) Appl. No.: 13/470,098

(22) Filed: May 11, 2012

(65) Prior Publication Data

US 2012/0288272 A1    Nov. 15, 2012

Related U.S. Application Data

(60) Provisional application No. 61/485,276, filed on May 12, 2011.

(51) Int. Cl.
*G03B 17/00* (2006.01)
*G03B 3/10* (2006.01)
*G03B 17/12* (2006.01)

(52) U.S. Cl.
CPC . *G03B 3/10* (2013.01); *G03B 17/12* (2013.01)

(58) Field of Classification Search
USPC ................... 396/529, 531; 359/819, 822, 826
See application file for complete search history.

(56) References Cited

U.S. PATENT DOCUMENTS

| | | | | |
|---|---|---|---|---|
| 5,991,097 A * | 11/1999 | Nomura et al. | ............... | 359/700 |
| 6,023,376 A * | 2/2000 | Nomura et al. | ............... | 359/694 |
| 7,065,295 B2 * | 6/2006 | Jeong et al. | .................... | 396/85 |
| 7,545,590 B2 * | 6/2009 | Chang | ........................... | 359/826 |
| 7,795,577 B2 * | 9/2010 | Olsen et al. | .................... | 250/239 |
| 7,872,819 B2 * | 1/2011 | Terada | .......................... | 359/819 |
| 2006/0132936 A1 * | 6/2006 | Yu | ................................... | 359/824 |

(Continued)

FOREIGN PATENT DOCUMENTS

| | | |
|---|---|---|
| CN | 2909319 Y | 6/2007 |
| CN | 101149457 A | 3/2008 |

(Continued)

OTHER PUBLICATIONS

CN Application No. 201210245469.2, Office Action dated Aug. 29, 2014 (with English summary).

*Primary Examiner* — Clayton E Laballe
*Assistant Examiner* — Warren K Fenwick
(74) *Attorney, Agent, or Firm* — Novak Druce Connolly Bove + Quigg LLP

(57) ABSTRACT

A camera module with a lens barrel containing a lens, and a lens carrier that slidably receives the lens barrel. Each of the exterior surface of the lens barrel and the interior surface of the lens carrier include a seating surface formed thereon. One of the exterior surface of the lens barrel and the interior surface of the lens carrier include a plurality of protrusions for controlling the relative position of the lens barrel and the lens carrier. The other of the exterior surface of the lens barrel and the interior surface of the lens carrier include a plurality of channels that are sized and arranged so as to slidably receive the protrusions to allow for the lens barrel to be slid into the lens carrier. The channels also each include a transverse section to allow the lens barrel to be pivoted about an optical axis of the lens barrel.

34 Claims, 6 Drawing Sheets

(56) References Cited

U.S. PATENT DOCUMENTS

| | | | |
|---|---|---|---|
| 2008/0075456 A1* | 3/2008 | Webster et al. | 396/535 |
| 2009/0195896 A1* | 8/2009 | Tsai | 359/819 |
| 2010/0002316 A1* | 1/2010 | Nomura | 359/817 |
| 2010/0080552 A1* | 4/2010 | Taki et al. | 396/529 |
| 2012/0140342 A1* | 6/2012 | Tsai | 359/819 |
| 2013/0170037 A1* | 7/2013 | Iizuka | 359/511 |

FOREIGN PATENT DOCUMENTS

| | | |
|---|---|---|
| CN | 201096944 Y | 8/2008 |
| KR | 10-2011-0024871 A | 3/2011 |

\* cited by examiner

CAMERA MODULE WITH THREADLESS LENS BARREL ENGAGEMENT DESIGN

CROSS REFERENCE

This application is the non-provisional of U.S. Provisional Pat. Appl. No. 61/485,276 filed May 12, 2011, entitled "CAMERA MODULE WITH THREADLESS LENS BARREL ENGAGEMENT DESIGN," which is hereby incorporated by reference into this application.

BACKGROUND

The disclosure herein relates generally to electronic devices, and more particularly to digital camera modules. Even more particularly, it relates to a digital camera module design that prevents or minimizes debris and particulate matter produced by the focusing process from contaminating the sensor array of an image capture device.

Digital camera modules are currently being incorporated into a variety of electronic devices. Such camera hosting devices include, but are not limited to, cellular telephones, personal data assistants (PDAs), and computers. The demand for digital camera modules continues to grow as the ability to incorporate the camera modules into host devices expands. Therefore, one design goal of digital camera modules is to make them as small as possible so that they will fit into an electronic device without substantially increasing the overall size of the device. Means for achieving this goal must, of course, preserve the quality of the image captured by the camera modules.

Such digital camera modules typically include a substrate, an image capture device, a housing, and a lens unit. The substrate is typically a printed circuit board (PCB) that includes circuitry to facilitate data exchange between the image capture device and the host device. The image capture device is mounted and electrically coupled to the circuitry of the PCB. The housing is then mounted on the PCB over the image capture device. The housing includes an opening that receives and centers the lens unit with respect to the image capture device. Typically, the opening includes a set of threads and the lens unit includes a complementary set of threads that facilitate the factory focusing of the camera module. During a factory focus operation, for example, focusing equipment rotates the lens unit with respect to the housing, which adjusts the distance between the lens unit and the image capture device. When the lens unit is properly focused, it is fixed in position with respect to the housing with an adhesive, a thermal weld, or the like.

Camera modules that are focused via thread sets have some disadvantages. For example, as the lens unit is rotated within the housing, sliding friction between threads can create particulate debris that could easily contaminate the image sensor and/or other optical components (e.g., infra-red filters, protective covers, other lenses, etc.). Consequently, these contaminants can accumulate and noticeably degrade the quality of captured images by, for example, blocking light to the image sensor. As another example, focusing operations can be difficult and consume a great deal of manufacturing time. As a result, the manufacturing output rate of camera modules that are focused via threads is relatively low.

In efforts to minimize the accumulation of such debris, manufacturers currently have to closely control the amount of torque used to rotate the lens unit during factory focusing. However, doing so is tedious and still can cause a significant amount of debris to form. Oftentimes, camera modules have to be discarded as a result of being contaminated. Accordingly, there are relatively high yield losses associated with camera modules that are focused via threads.

What is needed, therefore, is a camera module design that is less susceptible to contamination during the assembly and focusing processes. What is also needed is a camera module design that improves manufacturing output and focal accuracy.

SUMMARY

Disclosed herein is a camera module, that includes a housing; a lens carrier received within the housing, the lens carrier including a seating surface on an interior surface thereof; and a lens barrel containing a lens, the lens barrel including a seating surface on an exterior surface thereof, the lens barrel slidably received within the lens carrier to such point as the seating surface of the lens barrel meets the seating surface of the lens carrier.

The lens barrel may include a plurality of protrusions formed on an external surface thereof. The lens carrier may include a plurality of channels formed on an internal surface thereof, the channels each sized and arranged so as to slidably receive one of the protrusions when the lens barrel is slidably received within the lens carrier. Each channel may include a transverse section thereof to allow the lens barrel to be pivoted about an optical axis of the lens barrel once the lens barrel is slidably received within the lens carrier. The protrusions may be equally-spaced apart from each other. There may be three protrusions and they may each be angularly spaced apart from each other by 120 degrees.

The lens carrier may have a first cylindrically-shaped interior surface defining an opening having a first diameter and a second cylindrically-shaped interior surface defining an opening having a second diameter, the first diameter being smaller than the second diameter, the seating surface of the lens carrier being an annular surface that connects the first and second cylindrically-shaped interior surfaces. The lens barrel may have a first cylindrically-shaped exterior surface defining an opening having a first diameter and a second cylindrically-shaped exterior surface defining an opening having a second diameter, the first diameter being smaller than the second diameter, the seating surface of the lens barrel being an annular surface that connects the first and second cylindrically-shaped interior surfaces.

The camera module may further include an adhesive material affixing the lens carrier to the lens barrel. The camera module may further include a substrate to which the housing is attached; and an image capture device attached to the substrate.

Also disclosed is a method of assembling a camera module, the method including providing a lens carrier having a seating surface formed thereon; providing a lens barrel having a seating surface formed thereon; and slidably inserting the lens barrel into the lens carrier until the seating surface of the lens barrel abuts the seating surface of the lens carrier.

The method may further include using adhesive to affix the lens barrel to the lens carrier. One of the interior surface of the lens carrier and the exterior surface of the lens barrel may include a plurality of protrusions. The slidably inserting operation may include first aligning a plurality of protrusions on one of the lens carrier and the lens barrel with a plurality of channels on the other of the lens carrier and the lens barrel so that, when the lens barrel is slidably inserted, the protrusions are received within and slide along the channels. The method may further include, after the slidably inserting operation, pivoting the lens barrel about an optical axis associated therewith to move the protrusions into transverse sections of the channels.

BRIEF DESCRIPTION OF THE DRAWINGS

The disclosure herein is described with reference to the following drawings, wherein like reference numbers denote substantially similar elements.

DETAILED DESCRIPTION

Figure 1:
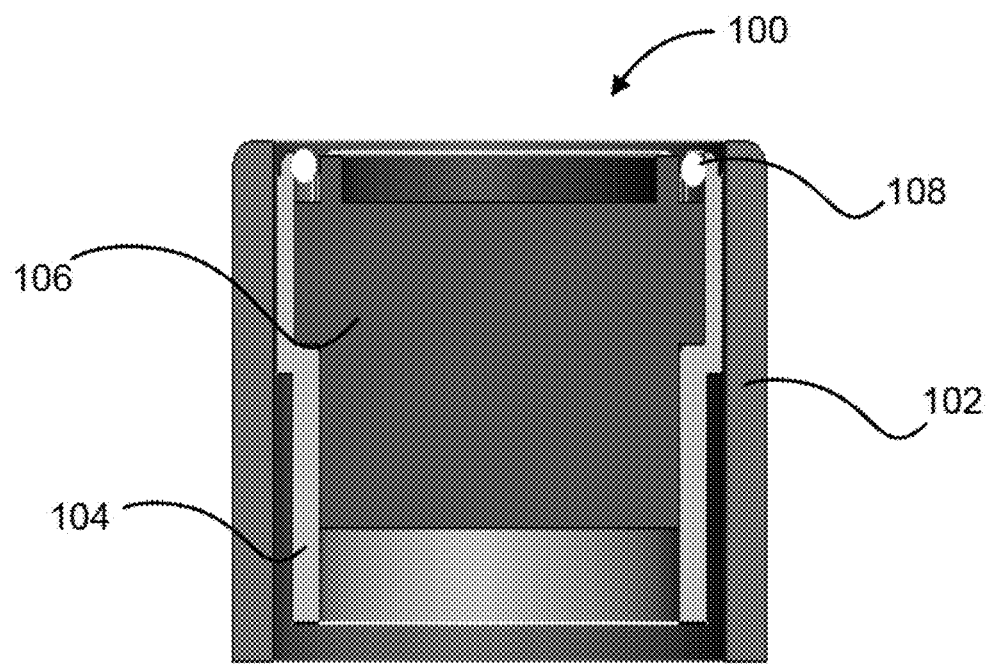
FIG. 1 is a cross sectional view of a threadless lens barrel engagement assembly 100 according to one embodiment.

While the embodiments disclosed herein are susceptible to various modifications and alternative forms, specific embodiments thereof have been shown by way of example in the drawings and are herein described in detail. It should be understood, however, that it is not intended to limit the invention to the particular form disclosed, but rather, the invention is to cover all modifications, equivalents, and alternatives of embodiments of the invention as defined by the claims. The disclosure is described with reference to the drawings, wherein like reference numbers denote substantially similar elements.

FIG. 1 is a cross sectional view of a threadless lens barrel engagement assembly 100 according to one embodiment. Assembly 100 includes a housing 102, a lens carrier 104, and a lens barrel 106. Lens carrier 104 is positioned within housing 102, and lens barrel 106 is positioned within lens carrier 104. Lens barrel 106 is fixably mounted in lens carrier 104 via an epoxy 108 or other suitable means.

Figure 2:
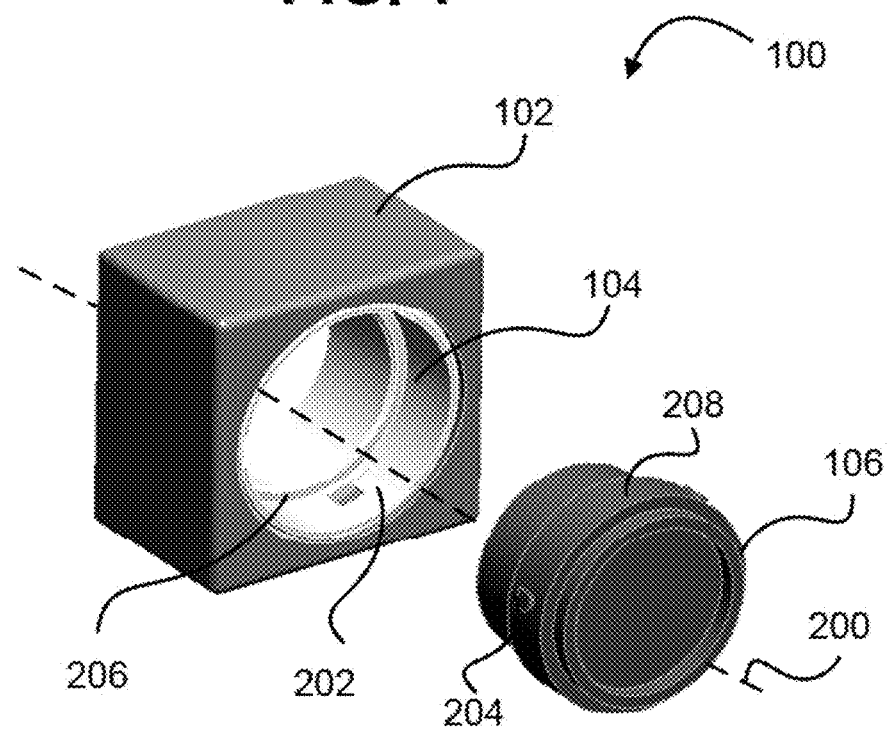
FIG. 2 is a partially-exploded perspective view of the threadless lens barrel engagement assembly 100 of FIG. 1.

FIG. 2 is a perspective view of lens barrel 106 exploded from assembly 100 along an optical axis 200. The interior of lens carrier 104 defines three concave channels 202 (with transverse sections provided for each channel for when the lens barrel 106 is pivoted), and lens barrel 106 defines three complementary convex features 204 that, together, facilitate the positioning of lens barrel 106 with respect to lens carrier 104. Lens carrier 104 further includes a surface 206 that defines a lip, shoulder, or sitting plane that extends generally perpendicularly with respect to optical axis 200. Similarly, lens barrel 106 defines a corresponding planar surface 208 that creates a lip or shoulder and extends generally perpendicularly with respect to the optical axis 200. When lens barrel 106 is received fully within lens carrier 104, the surfaces 206 and 208 come into contact.

Figure 3:
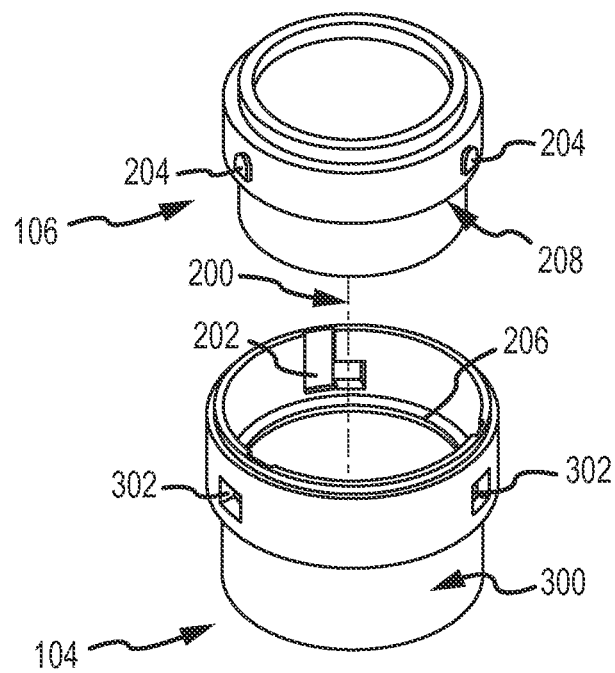
FIG. 3 is an exploded perspective view of a lens carrier 104 and a lens barrel 106 of the threadless lens barrel engagement assembly 100 of FIG. 1.

FIG. 3 is an exploded perspective view of lens carrier 104 and lens barrel 106. As shown, lens carrier 104 also includes a coil winding area 300 and three openings 302. Each of openings 302 is adjacent to and in communication with a respective one of channels 202.

In mounting lens barrel 106 to lens carrier 104, lens barrel 106 is first coaxially aligned with respect to lens carrier 104 wherein each of features 204 is aligned with a respective one of concave channels 202. Then, lens barrel 106 is inserted into lens carrier 104 such that features 204 slide in channels 202. Once lens barrel 106 is seated within lens carrier 104, lens barrel 106 is rotated clockwise about axis 200 thereby aligning each of features 204 with a respective one of openings 302. Alignment of features 204 with openings 302 locks the height position of lens barrel 106 with respect to lens carrier 104. When lens barrel 106 is seated within lens carrier 104, the planar surfaces 206 and 208 are parallel to one another and perpendicular to optical axis 200.

Figure 4:
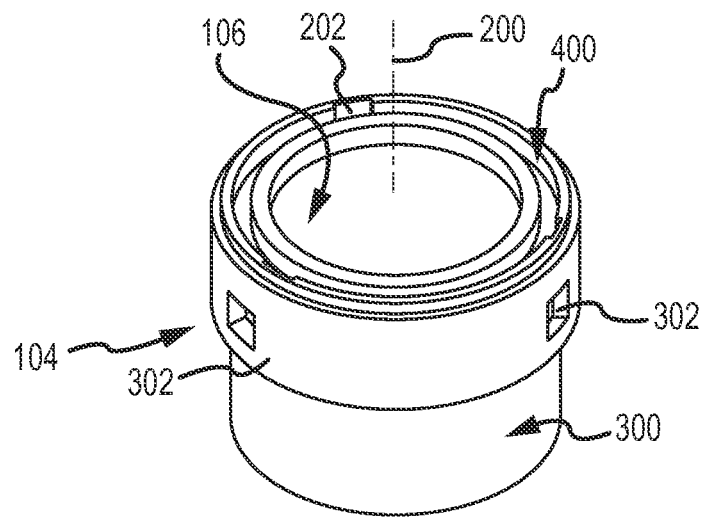
FIG. 4 is a perspective view wherein the lens carrier 104 and lens barrel 106 of FIG. 3 are shown assembled.

FIG. 4 is a perspective view of lens barrel 106 seated in lens carrier 104 wherein the height position of lens barrel 106 is locked. For slider release purposes, openings 302 provide access to lens barrel 106 through the side walls of lens carrier 104.

Once lens barrel 106 is properly seated in lens carrier 104, epoxy 108 is dispensed within a channel 400 defined by the interior walls of lens carrier 104 and the exterior of lens barrel 106. Once epoxy 108 cures, lens barrel 106 is permanently fixed in lens carrier 104. Lens carrier 104 can be received with housing 102 before or after lens barrel 106 is received within lens carrier 104. The lens carrier 104 may be fixed to the housing 102 or may be slidably received therein for autofocus or zoom operations. Also, the lens carrier 104 could be eliminated and the lens barrel 106 could be attached directly to the housing 102 in the fashion described herein for attachment of the lens barrel 106 to the lens carrier 104.

The three concave channels 202 and the three convex features 204 may be equally spaced apart from each other around the cylindrical shape of the lens carrier 104 and the lens barrel 106, respectively. For example, they could each be angularly spaced apart by 120 degrees. Other angular spacings could also be used, as could other numbers of channels 202 and features 204.

Figure 5:
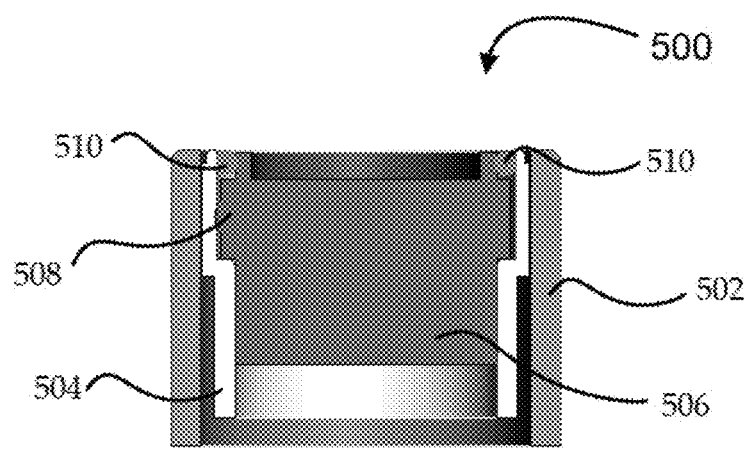
FIG. 5 is a cross sectional view of a threadless lens barrel engagement assembly 500 according to another embodiment.

FIG. 5 is a cross sectional view of a threadless lens barrel engagement assembly 500 according to another embodiment. Assembly 500 includes a housing 502, a lens carrier 504, and a lens barrel 506. Lens carrier 504 is positioned within housing 502, and lens barrel 506 is positioned within lens carrier 504. Lens barrel 506 includes three centering dimples or protrusions 508 and is fixably mounted in lens carrier 504 via epoxy 510 or other suitable means.

Figure 6:
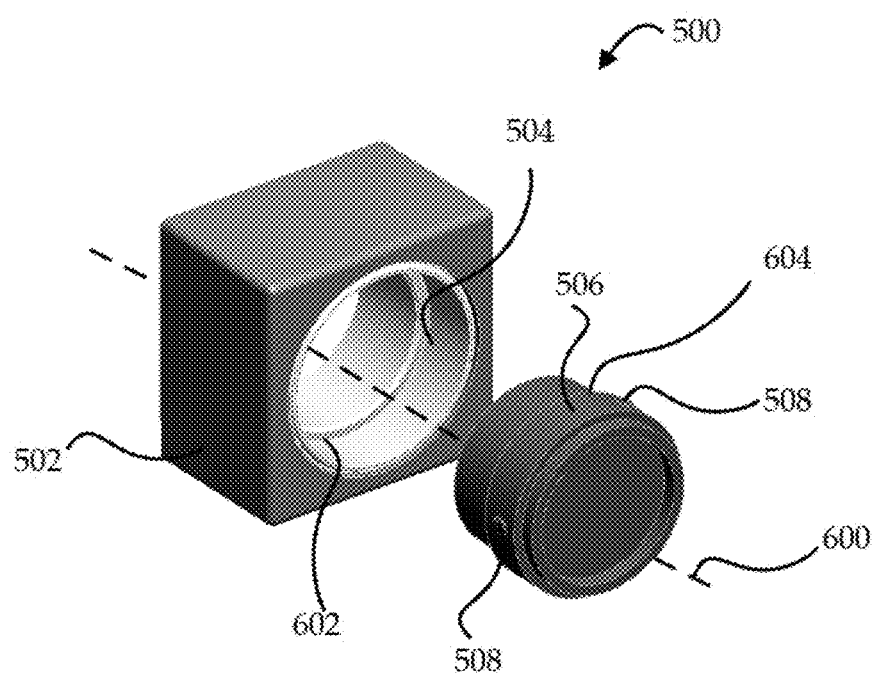
FIG. 6 is a partially-exploded perspective view of the threadless lens barrel engagement assembly 500 of FIG. 5.

FIG. 6 shows a perspective view of lens barrel 506 exploded from lens carrier 504 and housing 502 along an optical axis 600. As shown, lens carrier 504 includes a surface 602 that defines a lip, shoulder, or sitting plane that extends generally perpendicularly with respect to optical axis 600. Similarly, lens barrel 506 defines a planar surface 604 that creates a lip or shoulder and extends generally perpendicularly with respect to optical axis 600.

Figure 7:
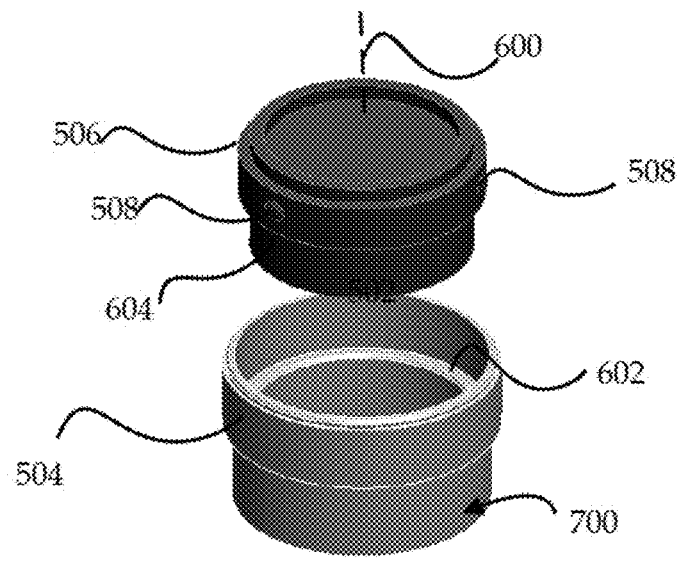
FIG. 7 is an exploded perspective view of a lens carrier 504 and a lens barrel 506 of the threadless lens barrel engagement assembly 500 of FIG. 5.

FIG. 7 shows a perspective view of lens barrel 506 exploded from lens carrier 504. As shown, lens carrier 504 further includes a coil winding area 700. In mounting lens barrel 506 to lens carrier 504, lens barrel 506 is first coaxially aligned with respect to lens carrier 504. Then, lens barrel 506 is inserted in lens carrier 504 such that surfaces 602 and 604 abut one another and are parallel. When lens barrel 506 is seated in lens carrier 504, protrusions 508 facilitate the coaxial alignment therebetween.

Figure 8:
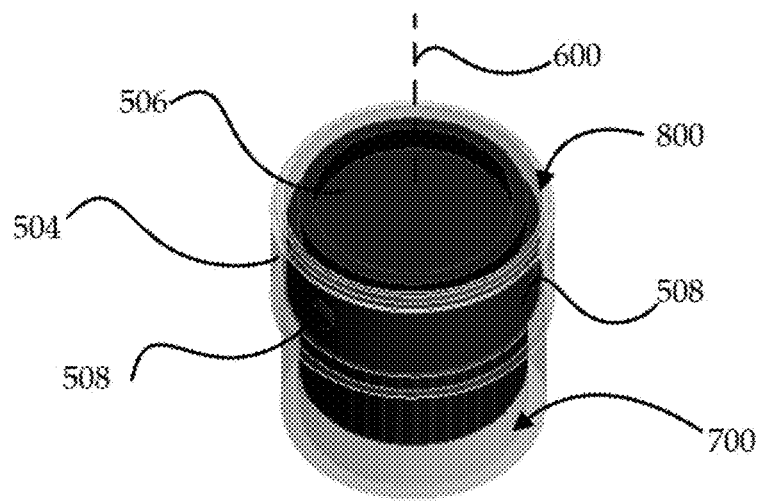
FIG. 8 is a perspective view wherein the lens carrier 504 and lens barrel 506 of FIG. 7 are shown assembled, with the lens carrier 504 made partially transparent in order to see the lens barrel 506 seated therewithin.

FIG. 8 shows a perspective view of lens barrel 506 seated in lens carrier 504. With lens barrel 506 being properly seated in lens carrier 504, epoxy 510 is dispensed within a channel 800 defined by the interior wall(s) of lens carrier 504 and the exterior of lens barrel 506. Once epoxy 510 cures, lens barrel 506 is permanently fixed in lens carrier 504.

Figure 9:
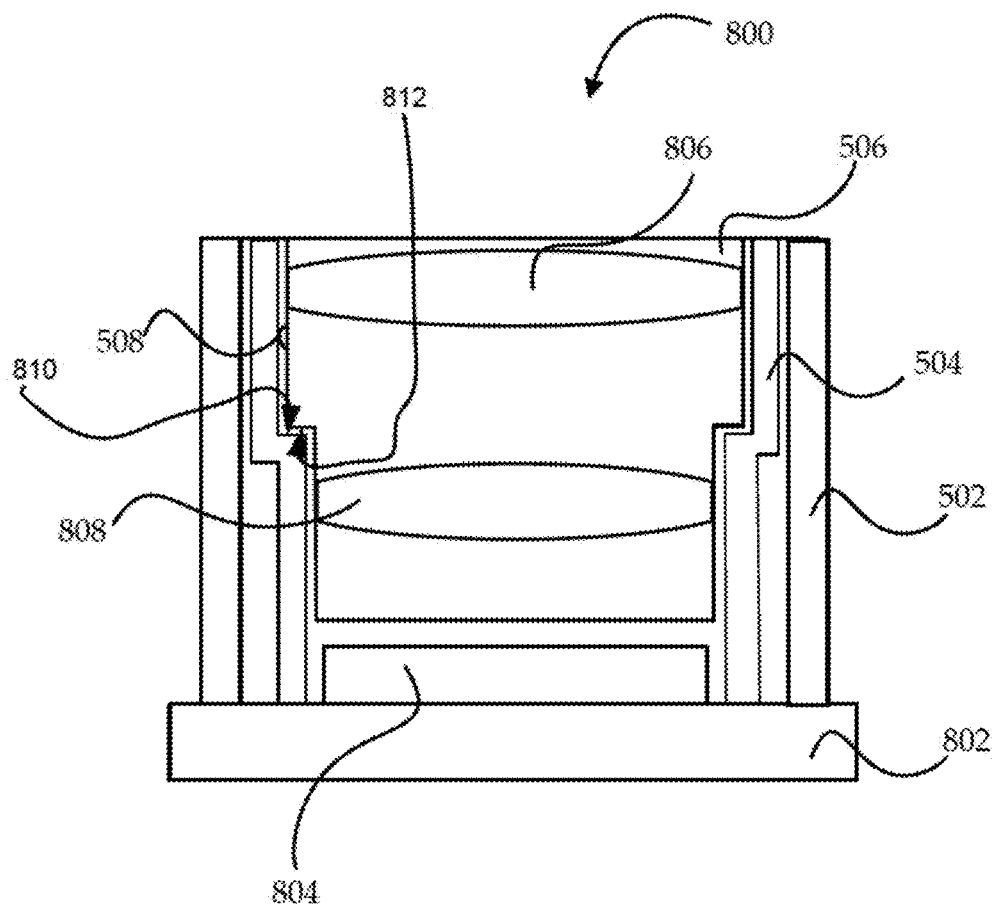
FIG. 9 is a sectional view of a camera module.

FIG. 9 shows further detail about a camera module 800. As can be seen, the camera module 800 includes a substrate 802 (e.g., a printed circuit board (which may or may not be flexible) or any other suitable type of substrate) and an image capture device 804 (e.g., a CMOS image sensor or any other suitable type of ICD). The previously-described combination of the housing 502, the lens carrier 504, and the lens barrel 506 may be attached by any suitable means. Further, this combination may be attached to the substrate 802, the ICD 804, or to both. In this case, it is shown as attached to the substrate 802. The lens barrel in this example is shown as containing two lens elements 806 and 808. Although there are two elements shown here, the lens could include any suitable number of lens elements. Further, the lens elements could be of any suitable shape, which could include symmetrical or asymmetrical. Further, although double-convex lens elements are shown here, this is just for ease of illustration. The previously-described lips or shoulders on the lens carrier 504 and lens barrel 506 can be seen well in this figure, and it can be seen in conjunction with the other figures that they are shaped as annular surfaces. They may be more generally referred to as first and second seating surfaces 810 and 812 that positionally register the lens barrel 506 with the lens carrier 504. They are shown in the figure as not quite in contact with each other, but they may or may not be in contact.

Figure 10:
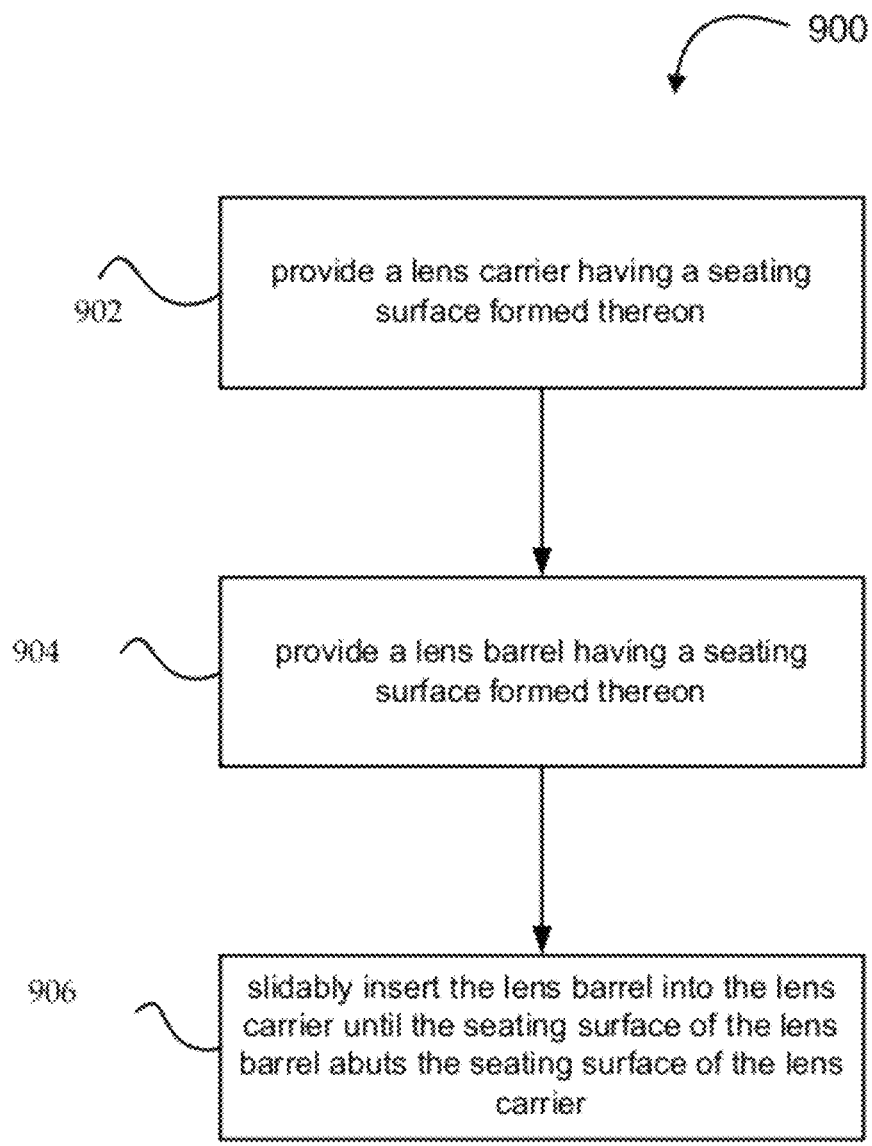
FIG. 10 is a flowchart of a process for assembling a camera module.

FIG. 10 shows a flowchart 900 of the process disclosed herein. A lens carrier is provided (902) having a seating surface formed thereon. A lens barrel is provided (904) having a seating surface formed thereon. The lens barrel is slidably inserted (906) into the lens carrier until the seating surface of the lens barrel abuts the seating surface of the lens carrier. Other subsequent steps not shown that may be employed may include one or both of: pivoting the lens barrel relative to the lens carrier in order to lock the lens barrel in place by causing the protrusions 204/508 to slide into transverse sections of the channels 202; and adhering the lens barrel to the lens carrier with a suitable adhesive or epoxy.

Although the disclosure herein describes the protrusions as being on the exterior surface of the lens barrel and the channels as being on the interior surface of the lens carrier, these positions could be reversed. Further the shape of the channel could be changed to any suitable shape.

The disclosed camera module provide several advantages over the prior art. First, there is the elimination of contamination of the image sensor caused by the focusing process of the lens barrel, for example, when complementary thread sets are employed. This, in turn, reduces contamination-related yield losses during production. Furthermore, there is less risk of contamination if the camera module is exposed to non-controlled environment(s) during the assembly process.

While the embodiments of the invention have been illustrated and described in detail in the drawings and foregoing description, such illustration and description are to be considered as examples and not restrictive in character. For example, certain embodiments described hereinabove may be combinable with other described embodiments and/or arranged in other ways (e.g., process elements may be performed in other sequences). Accordingly, it should be understood that only example embodiments and variants thereof have been shown and described.

We claim:

1. A camera module, comprising:
    a housing;
    a lens carrier received within the housing, the lens carrier including a seating surface on an interior surface thereof; and
    a lens barrel containing a lens, the lens barrel including a seating surface on an exterior surface thereof, the lens barrel slidably received within the lens carrier to such point as the seating surface of the lens barrel meets the seating surface of the lens carrier; and wherein
    the lens carrier has a first cylindrically-shaped interior surface defining an opening having a first diameter and a second cylindrically-shaped interior surface defining an opening having a second diameter, the first diameter being smaller than the second diameter, the seating surface of the lens carrier being an annular surface that connects the first and second cylindrically-shaped interior surfaces.

2. A camera module as defined in claim 1, wherein the lens barrel includes a plurality of protrusions formed on an external surface thereof.

3. A camera module as defined in claim 2, wherein the lens carrier includes a plurality of channels formed on an internal surface thereof, the channels each sized and arranged so as to slidably receive one of the protrusions when the lens barrel is slidably received within the lens carrier.

4. A camera module as defined in claim 3, wherein each channel includes a transverse section thereof to allow the lens barrel to be pivoted about an optical axis of the lens barrel once the lens barrel is slidably received within the lens carrier.

5. A camera module as defined in claim 3, wherein the protrusions are equally-spaced apart from each other.

6. A camera module as defined in claim 5, wherein there are three protrusions and they each are angularly spaced apart from each other by 120 degrees.

7. A camera module as defined in claim 1, wherein the lens barrel has a first cylindrically-shaped exterior surface having a first diameter and a second cylindrically-shaped exterior surface having a second diameter, the first diameter of the first cylindrically-shaped exterior surface being smaller than the second diameter of the second cylindrically-shaped exterior surface, the seating surface of the lens barrel being an annular surface that connects the first and second cylindrically-shaped exterior surfaces.

8. A camera module as defined in claim 1, further including an adhesive material affixing the lens carrier to the lens barrel.

9. A camera module as defined in claim 1, further including:
    a substrate to which the housing is attached; and
    an image capture device attached to the substrate.

10. A method of assembling a camera module, comprising:
    providing a lens carrier having a seating surface formed thereon;
    providing a lens barrel having a seating surface formed thereon; and
    slidably inserting the lens barrel into the lens carrier until the seating surface of the lens barrel abuts the seating surface of the lens carrier; and wherein
    the slidably inserting operation includes first aligning a plurality of protrusions on one of the lens carrier and the lens barrel with a plurality of channels on the other of the lens carrier and the lens barrel so that, when the lens barrel is slidably inserted, the protrusions are received within and slide along the channels.

11. A method as defined in claim 10, further including using adhesive to affix the lens barrel to the lens carrier.

12. A method as defined in claim 10, wherein one of an interior surface of the lens carrier and an exterior surface of the lens barrel includes a plurality of protrusions.

13. A method as defined in claim 10, further including, after the slidably inserting operation, pivoting the lens barrel about an optical axis associated therewith to move the protrusions into transverse sections of the channels.

14. A camera module, comprising:
a housing;
a lens carrier received within the housing, the lens carrier including a seating surface on an interior surface thereof; and
a lens barrel containing a lens, the lens barrel including a seating surface on an exterior surface thereof, the lens barrel slidably received within the lens carrier to such point as the seating surface of the lens barrel meets the seating surface of the lens carrier; and wherein
the lens barrel has a first cylindrically-shaped exterior surface having a first diameter and a second cylindrically-shaped exterior surface having a second diameter, the first diameter of the first cylindrically-shaped exterior surface being smaller than the second diameter of the second cylindrically-shaped exterior surface, the seating surface of the lens barrel being an annular surface that connects the first and second cylindrically-shaped exterior surfaces.

15. A camera module as defined in claim 14, wherein the lens barrel includes a plurality of protrusions formed on an external surface thereof.

16. A camera module as defined in claim 15, wherein the lens carrier includes a plurality of channels formed on an internal surface thereof, the channels each sized and arranged so as to slidably receive one of the protrusions when the lens barrel is slidably received within the lens carrier.

17. A camera module as defined in claim 16, wherein each channel includes a transverse section thereof to allow the lens barrel to be pivoted about an optical axis of the lens barrel once the lens barrel is slidably received within the lens carrier.

18. A camera module as defined in claim 16, wherein the protrusions are equally-spaced apart from each other.

19. A camera module as defined in claim 18, wherein there are three protrusions and they each are angularly spaced apart from each other by 120 degrees.

20. A camera module as defined in claim 14, further including an adhesive material affixing the lens carrier to the lens barrel.

21. A camera module as defined in claim 14, further including:
a substrate to which the housing is attached; and
an image capture device attached to the substrate.

22. A camera module, comprising:
a housing;
a lens carrier received within the housing, the lens carrier including a seating surface on an interior surface thereof;
a lens barrel containing a lens, the lens barrel including a seating surface on an exterior surface thereof, the lens barrel slidably received within the lens carrier to such point as the seating surface of the lens barrel meets the seating surface of the lens carrier; and
an adhesive material affixing the lens carrier to the lens barrel.

23. A camera module as defined in claim 22, wherein the lens barrel includes a plurality of protrusions formed on an external surface thereof.

24. A camera module as defined in claim 23, wherein the lens carrier includes a plurality of channels formed on an internal surface thereof, the channels each sized and arranged so as to slidably receive one of the protrusions when the lens barrel is slidably received within the lens carrier.

25. A camera module as defined in claim 24, wherein each channel includes a transverse section thereof to allow the lens barrel to be pivoted about an optical axis of the lens barrel once the lens barrel is slidably received within the lens carrier.

26. A camera module as defined in claim 24, wherein the protrusions are equally-spaced apart from each other.

27. A camera module as defined in claim 26, wherein there are three protrusions and they each are angularly spaced apart from each other by 120 degrees.

28. A camera module as defined in claim 22, wherein:
the lens carrier has a first cylindrically-shaped interior surface defining an opening having a first diameter and a second cylindrically-shaped interior surface defining an opening having a second diameter, the first diameter being smaller than the second diameter, the seating surface of the lens carrier being an annular surface that connects the first and second cylindrically-shaped interior surfaces; and
the lens barrel has a first cylindrically-shaped exterior surface having a first diameter and a second cylindrically-shaped exterior surface having a second diameter, the first diameter of the first cylindrically-shaped exterior surface being smaller than the second diameter of the second cylindrically-shaped exterior surface, the seating surface of the lens barrel being an annular surface that connects the first and second cylindrically-shaped exterior surfaces.

29. A camera module as defined in claim 22, further including:
a substrate to which the housing is attached; and
an image capture device attached to the substrate.

30. A method of assembling a camera module, comprising:
providing a lens carrier having a seating surface formed thereon;
providing a lens barrel having a seating surface formed thereon;
slidably inserting the lens barrel into the lens carrier until the seating surface of the lens barrel abuts the seating surface of the lens carrier; and
using adhesive to affix the lens barrel to the lens carrier.

31. A method as defined in claim 30, wherein one of an interior surface of the lens carrier and an exterior surface of the lens barrel includes a plurality of protrusions.

32. A method as defined in claim 30, wherein:
the slidably inserting operation includes first aligning a plurality of protrusions on one of the lens carrier and the lens barrel with a plurality of channels on the other of the lens carrier and the lens barrel so that, when the lens barrel is slidably inserted, the protrusions are received within and slide along the channels; and
the method further includes, after the slidably inserting operation, pivoting the lens barrel about an optical axis associated therewith to move the protrusions into transverse sections of the channels.

33. A method of assembling a camera module, comprising:
providing a lens carrier having a seating surface formed thereon;
providing a lens barrel having a seating surface formed thereon; and
slidably inserting the lens barrel into the lens carrier until the seating surface of the lens barrel abuts the seating surface of the lens carrier; and wherein one of an interior surface of the lens carrier and an exterior surface of the lens barrel includes a plurality of protrusions.

34. A method as defined in claim 33, wherein:

the slidably inserting operation includes first aligning a plurality of protrusions on one of the lens carrier and the lens barrel with a plurality of channels on the other of the lens carrier and the lens barrel so that, when the lens barrel is slidably inserted, the protrusions are received within and slide along the channels; and the method further includes, after the slidably inserting operation, pivoting the lens barrel about an optical axis associated therewith to move the protrusions into transverse sections of the channels.

* * * * *